US 10,094,295 B2

(12) United States Patent
Ullyott et al.

(10) Patent No.: US 10,094,295 B2
(45) Date of Patent: Oct. 9, 2018

(54) GAS TURBINE ENGINE WITH TRANSMISSION

(71) Applicant: Pratt & Whitney Canada Corp., Longueuil (CA)

(72) Inventors: Richard Ullyott, St Bruno (CA); Keith Morgan, Westmount (CA); Jean Dubreuil, Boucherville (CA); Lazar Mitrovic, Longueuil (CA); Kevin A. Dooley, Mississauga (CA); Stephen Kenny, Caledon Village (CA); Ilya Medvedev, St. Petersburg (RU); Johnny Vinski, Chateauguay (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 1171 days.

(21) Appl. No.: 13/754,304

(22) Filed: Jan. 30, 2013

(65) Prior Publication Data

US 2014/0290265 A1 Oct. 2, 2014

(51) Int. Cl.
*F02C 7/36* (2006.01)
*F02C 3/113* (2006.01)

(52) U.S. Cl.
CPC .............. *F02C 7/36* (2013.01); *F02C 3/113* (2013.01); *F05D 2220/324* (2013.01); *F05D 2220/327* (2013.01)

(58) Field of Classification Search
CPC ...... F02C 7/36; F02C 3/113; F05D 2220/327; F05D 2220/324
USPC ................... 60/226.1, 268, 39.163, 792, 802
See application file for complete search history.

(56) References Cited

U.S. PATENT DOCUMENTS

| | | | |
|---|---|---|---|
| 3,150,544 A * | 9/1964 | Brass | F16H 3/66 475/297 |
| 3,433,095 A * | 3/1969 | Tuck | F16H 47/04 475/81 |
| 3,641,766 A | 2/1972 | Uehling | |
| 3,965,684 A | 6/1976 | Nomura | |
| 4,008,628 A | 2/1977 | Orshansky, Jr. | |
| 4,186,554 A | 2/1980 | Possell | |
| 4,632,337 A | 12/1986 | Moore | |

(Continued)

OTHER PUBLICATIONS

A New Approach to Turboshaft Engine Growth, M. A. Compagnon, General Electric Company, Lynn, Massachusetts pp. 80-41-1 to 80-41-6, May 13, 1980.

*Primary Examiner* — Ted Kim
(74) *Attorney, Agent, or Firm* — Norton Rose Fulbright Canada LLP

(57) ABSTRACT

A multi spool gas turbine engine with a differential having a selectively rotatable member which rotational speed determines a variable ratio between rotational speeds of driven and driving members of the differential. The driven member is engaged to the first spool and a rotatable shaft independent of the other spools (e.g. connected to a compressor rotor) is engaged to the driving member. First and second power transfer devices are engaged to the first spool and the selectively rotatable member, respectively. A circuit interconnects the power transfer devices and allows a power transfer therebetween, and a control unit controls the power being transferred between the power transfer devices. Power can thus be transferred between the first spool and the selectively rotatable member to change the speed ratio between the first spool and the rotatable shaft.

15 Claims, 8 Drawing Sheets

(56) References Cited

U.S. PATENT DOCUMENTS

| | | |
|---|---|---|
| 5,033,996 A | 7/1991 | Frey |
| 5,577,973 A | 11/1996 | Schmidt |
| 5,694,765 A * | 12/1997 | Hield .................... F02C 7/32 |
| | | 60/39.163 |
| 5,782,433 A | 7/1998 | Goi et al. |
| 5,873,800 A | 2/1999 | Maslow et al. |
| 6,042,499 A | 3/2000 | Goi et al. |
| 6,053,452 A | 4/2000 | Yamakawa et al. |
| 6,082,967 A | 7/2000 | Loisy |
| 6,254,504 B1 | 7/2001 | Goi et al. |
| 6,607,357 B2 | 8/2003 | Caramaschi |
| 6,695,254 B2 | 2/2004 | Zoppitelli et al. |
| 6,895,741 B2 | 5/2005 | Rago |
| 7,044,877 B2 | 5/2006 | Ai |
| 7,107,972 B1 | 9/2006 | Jones et al. |
| 7,107,973 B1 | 9/2006 | Jones et al. |
| 7,115,066 B1 | 10/2006 | Lee |
| 7,396,209 B2 | 7/2008 | Miller et al. |
| 7,422,543 B2 | 9/2008 | Ransbarger et al. |
| 7,513,120 B2 | 4/2009 | Kupratis |
| 7,651,050 B2 | 1/2010 | Lappos et al. |
| 7,727,110 B2 | 6/2010 | Miller et al. |
| 2003/0232692 A1* | 12/2003 | Chen ...................... F16H 3/74 |
| | | 475/331 |
| 2004/0043856 A1* | 3/2004 | Xiaolan ................ B60K 6/365 |
| | | 475/5 |
| 2008/0223640 A1* | 9/2008 | Clauson ................ B60K 6/365 |
| | | 180/69.6 |
| 2010/0093476 A1 | 4/2010 | Carter et al. |
| 2010/0219779 A1* | 9/2010 | Bradbrook .............. F02C 3/113 |
| | | 60/802 |

\* cited by examiner

GAS TURBINE ENGINE WITH TRANSMISSION

TECHNICAL FIELD

The application relates generally to gas turbine engines and, more particularly, to a gas turbine engine having a transmission.

BACKGROUND OF THE ART

In a turbofan engine, rotor(s) of the low pressure turbine driven by the exhaust flow of the core section are generally drivingly connected to rotor(s) of a low pressure compressor, including the fan, through the low pressure shaft. In turboprop and turboshaft engines, a low pressure compressor rotor may also be connected to the low pressure or power shaft, and the propeller or output shaft is driven by the low pressure shaft either directly or through a fixed ratio gearbox.

Because power demands on the engine vary, for example between take-off and cruise conditions, the turbine and compressor rotors of the core section typically have to rotate at a relatively large range of rotational speeds in order for the low pressure turbine rotor(s), and thus the low pressure compressor rotor(s) and/or propeller or output shaft, to have the required rotational speed. Low power requirement conditions may require the rotors of the core section to rotate relatively far below their optimal rotational speed, which may limit the engine's efficiency in such conditions.

SUMMARY

In one aspect, there is provided a gas turbine engine comprising: at least two independently rotatable engine spools; at least one turbine rotor drivingly engaged to a first one of the engine spools; a differential having coupled members including a driven member, a driving member, and a selectively rotatable member with a rotational speed of the selectively rotatable member determining a variable ratio between rotational speeds of the driven and driving members, the driven member being drivingly engaged to the first spool; a rotatable shaft drivingly engaged to the driving member and rotatable independently from all but the first of the engine spools; a first power transfer device drivingly engaged to the first spool; a second power transfer device drivingly engaged to the selectively rotatable member; a circuit interconnecting the power transfer devices and allowing a power transfer therebetween; and a control unit controlling the power being transferred between the power transfer devices through the circuit.

In another aspect, there is provided a gas turbine engine comprising: a low pressure turbine located downstream of and in fluid communication with an exhaust of a high pressure section of the engine, the low pressure turbine having at least one turbine rotor; a differential having coupled members including a driven member, a driving member, and a selectively rotatable member with a rotational speed of the selectively rotatable member determining a variable ratio between rotational speeds of the driven and driving members; a low pressure shaft drivingly interconnecting each turbine rotor to the driven member; a low pressure compressor located upstream of and having an exhaust in fluid communication with the high pressure section of the engine, the low pressure compressor having at least one compressor rotor drivingly interconnected to the driving member; first means for transferring power at least one of to and from the low pressure shaft; second means for transferring power at least the other of to and from the selectively rotatable member; and a control unit connecting the first and second power transfer means and controlling power being transferred therebetween.

In a further aspect, there is provided a method of adjusting a speed of a rotatable shaft of a gas turbine engine having a high pressure section including interconnected compressor and turbine rotors, the method comprising: rotating at least one rotor of a low pressure turbine with a flow of exhaust gases from the high pressure section; driving a rotation of the rotatable shaft with a power shaft through a variable transmission, the power shaft being driven by the at least one rotor of the low pressure turbine; and transferring power between the power shaft and a rotational member of the transmission to change a ratio of rotational speeds between the rotatable shaft and the power shaft.

DESCRIPTION OF THE DRAWINGS

Reference is now made to the accompanying figures in which.

DETAILED DESCRIPTION

Figure 1:
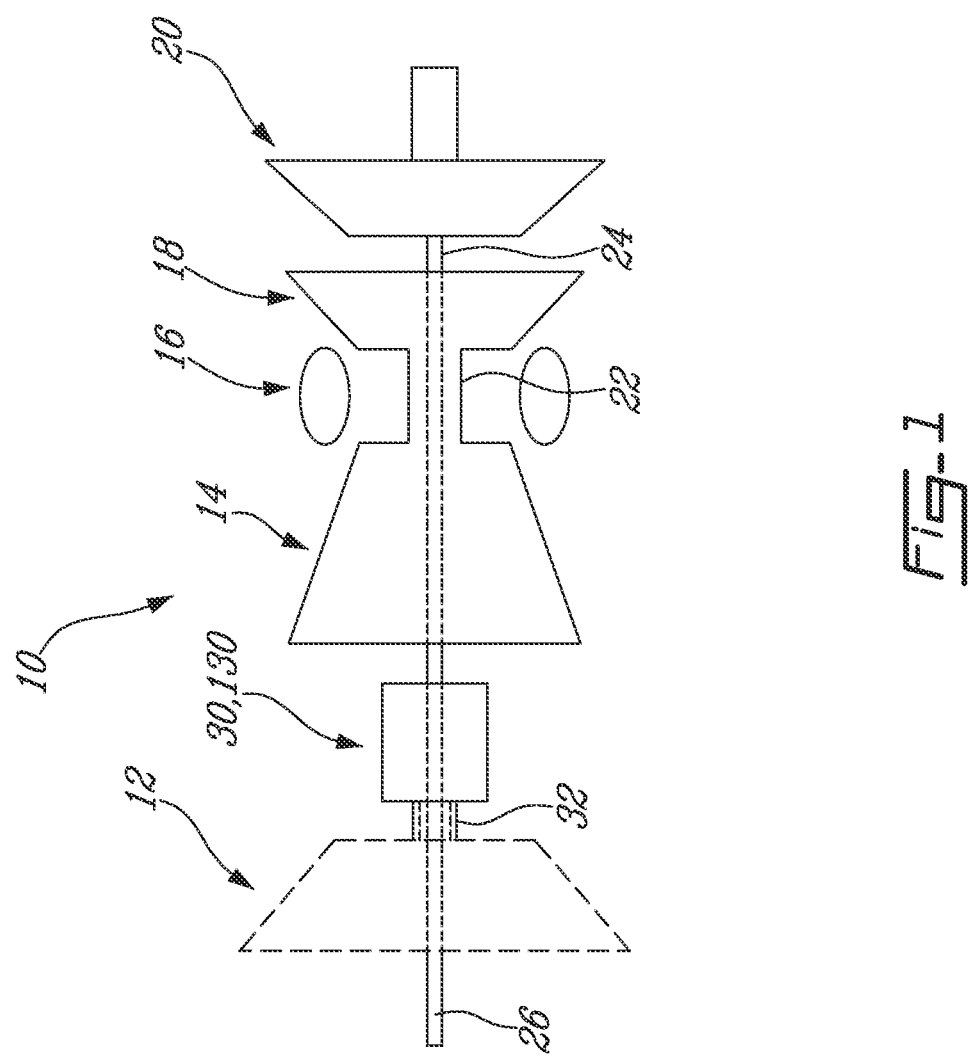
FIG. 1 is a schematic cross-sectional view of a gas turbine engine having a transmission in accordance with a particular embodiment.

FIG. 1 schematically illustrates a gas turbine engine 10, generally comprising in serial flow communication a low pressure compressor section 12 and a high pressure compressor section 14 for pressurizing the air, a combustor 16 in which the compressed air is mixed with fuel and ignited for generating an annular stream of hot combustion gases, a high pressure turbine section 18 for extracting energy from the combustion gases and driving the high pressure compressor section 14, and a low pressure turbine section 20 for further extracting energy from the combustion gases and driving at least the low pressure compressor section 12.

The engine 10 includes a high pressure shaft or spool 22 interconnecting the rotors of the high pressure turbine and compressor sections 18, 14, and a low pressure or power shaft or spool 24 allowing the rotor(s) of the low pressure turbine section 20 to drive the rotor(s) of the compressor sections 12, as will be further detailed below. In a particular embodiment, the high pressure shaft 22 is hollow and the low pressure shaft 24 extends therethrough. The two shafts 22, 24 are free to rotate independently from one another. The engine 10 further includes a variable transmission 30, 130 driven by the low pressure shaft 24 and driving a rotatable transmission shaft 32. The transmission 30, 130 is controlled to vary a ratio between the rotational speeds of the low pressure shaft 24 and the transmission shaft 32.

Figure 2:
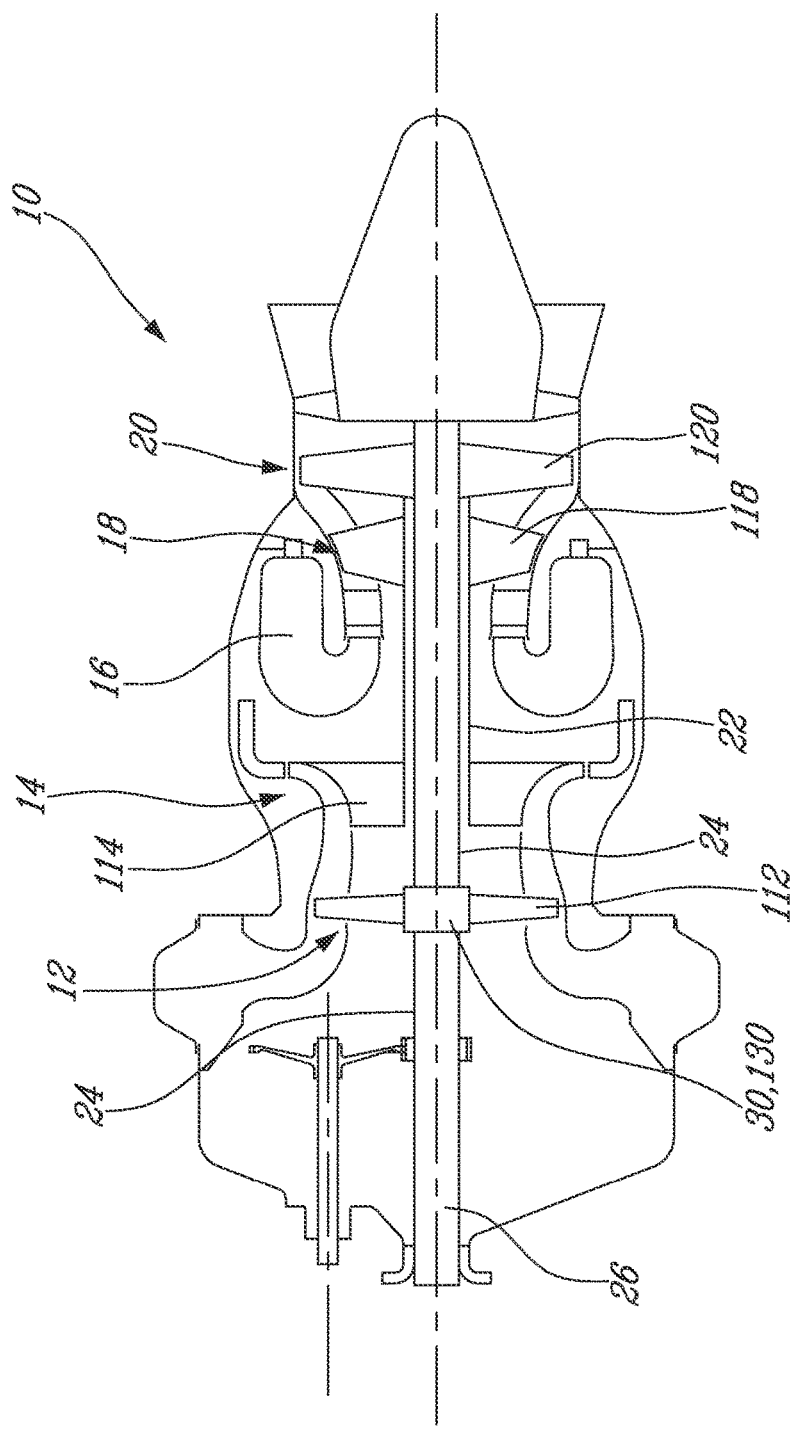
FIG. 2 is a schematic cross sectional view of an exemplary gas turbine engine such as that shown in FIG. 1.

The engine 10 schematically illustrated in FIG. 1 can be any type of gas turbine engine. In a particular embodiment shown in FIG. 2, the gas turbine engine 10 is a turboshaft engine. The high pressure compressor section 14 includes at least one high pressure compressor rotor 114 drivingly engaged to the high pressure shaft 22. The high pressure turbine section 18 includes at least one turbine rotor 118 also drivingly engaged to the high pressure shaft 22. The high pressure compressor and turbine rotors 114, 118 are directly engaged to the high pressure shaft 22, so that they rotate at a same speed.

The low pressure turbine 20 includes at least one low pressure turbine rotor 120 directly drivingly engaged to the low pressure shaft 24 so as to rotate at the same speed. The engine 10 further includes an output shaft 26, which in a particular embodiment is an extension of the low pressure shaft 24 extending through the transmission 30, such that the transmission shaft 32 is hollow (see FIG. 3) and extends around the low pressure shaft and output shaft 26. In other words, in this particular embodiment, the output shaft 26 of the engine 10 is an integral section of the low pressure shaft 24 and not affected by the transmission 30.

The low pressure compressor 12 includes at least one low pressure compressor rotor 112 connected to the transmission shaft 32 to be drivingly engaged to the low pressure shaft 24 through the variable transmission 30. The variable transmission 30 allows for a variation of the rotational speed of the low pressure compressor rotor(s) 112 independently of the speed of the turbine sections 18, 20, e.g. while keeping the rotational speed of the turbine sections 18, 20 substantially constant or constant. For example, the ratio of the variable transmission 30 may be adjusted such as to have a lower low pressure ratio and flow at lower power demands (e.g. cruise) and an increased low pressure ratio and flow at higher power demands (e.g. take-off).

Figure 3:
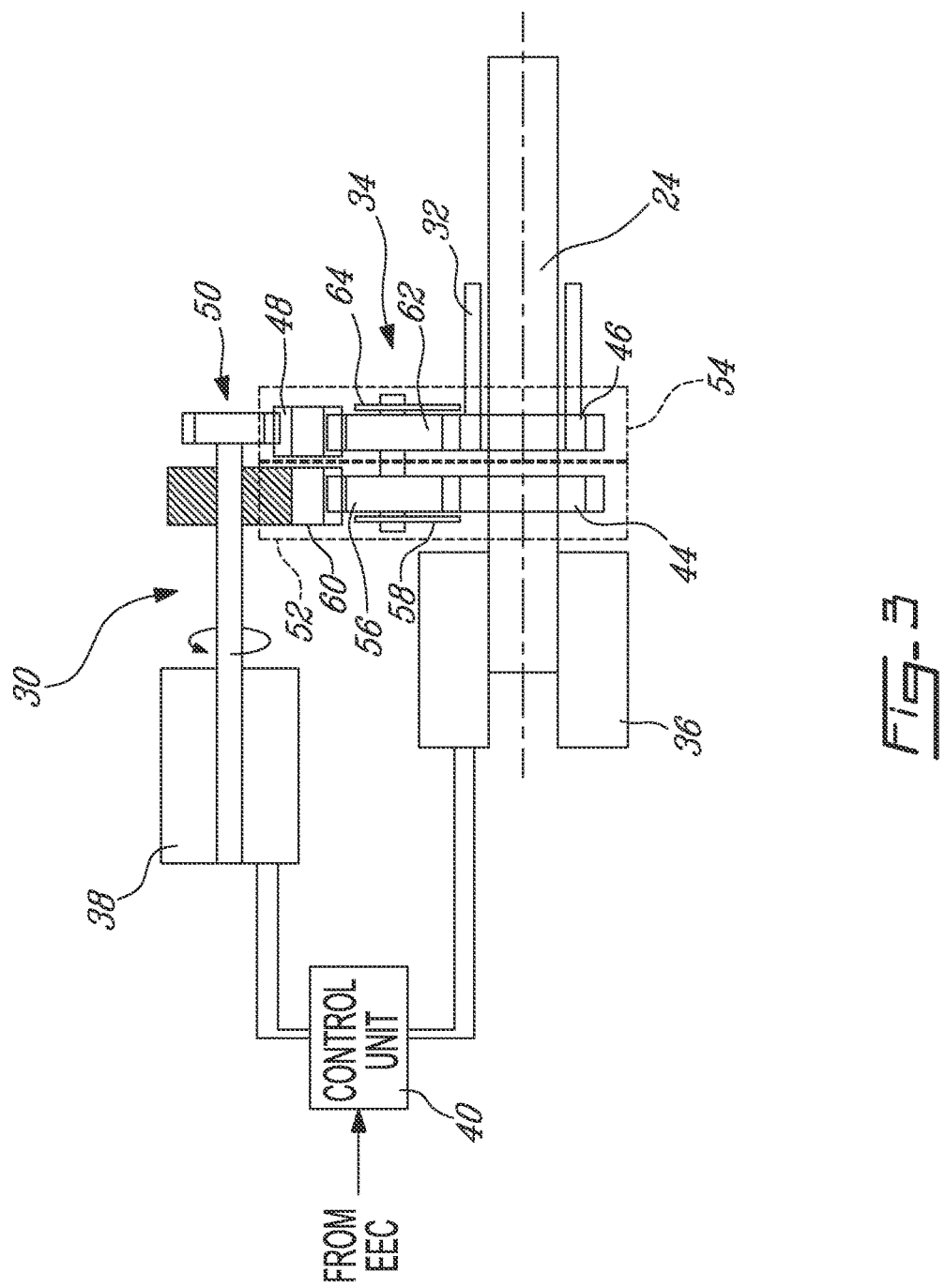
FIG. 3 is a schematic cross sectional view of a transmission of the gas turbine engine of FIG. 2.
Figure 4:
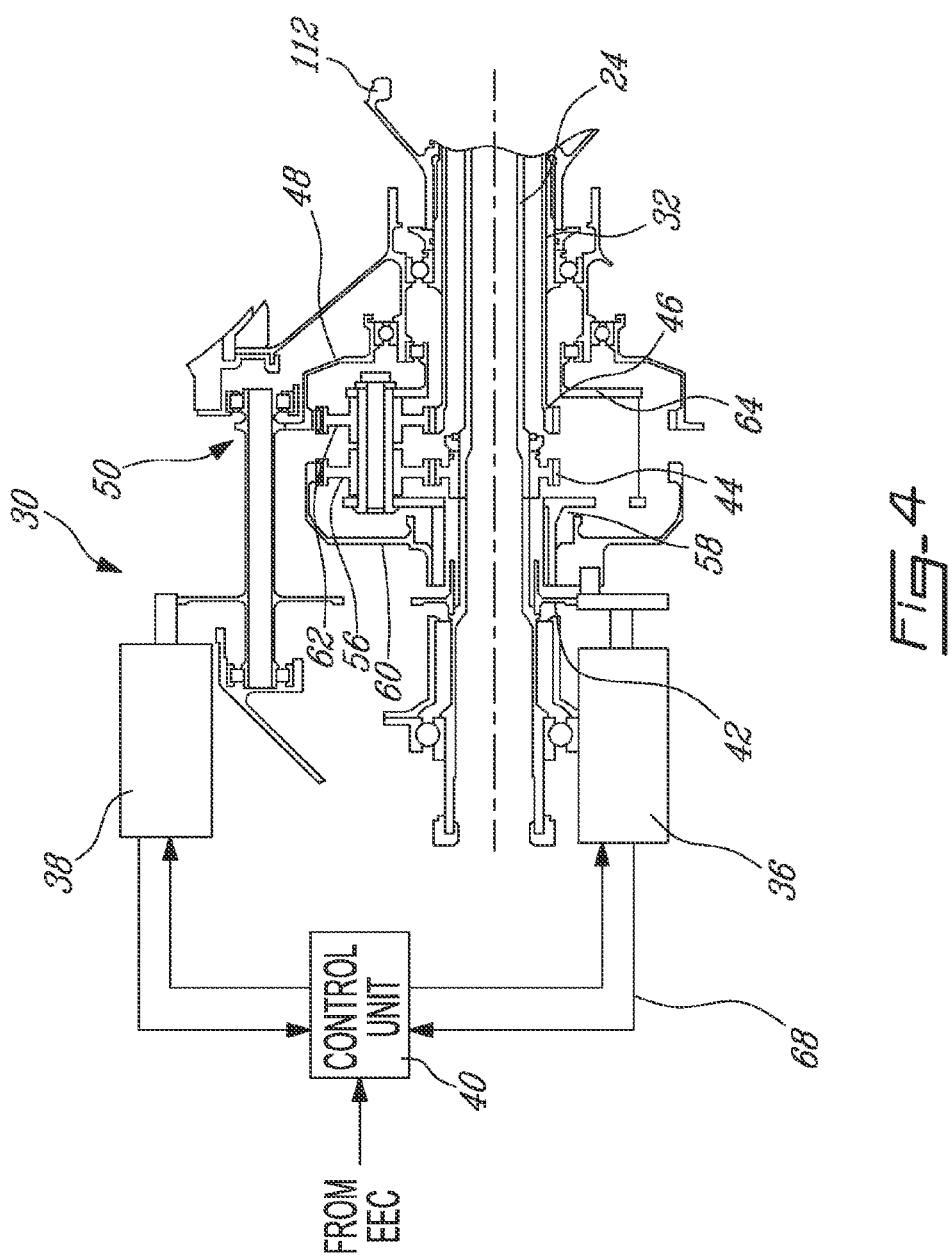
FIG. 4 is a schematic cross sectional view of an alternate transmission of the gas turbine engine of FIG. 2.
Figure 5:
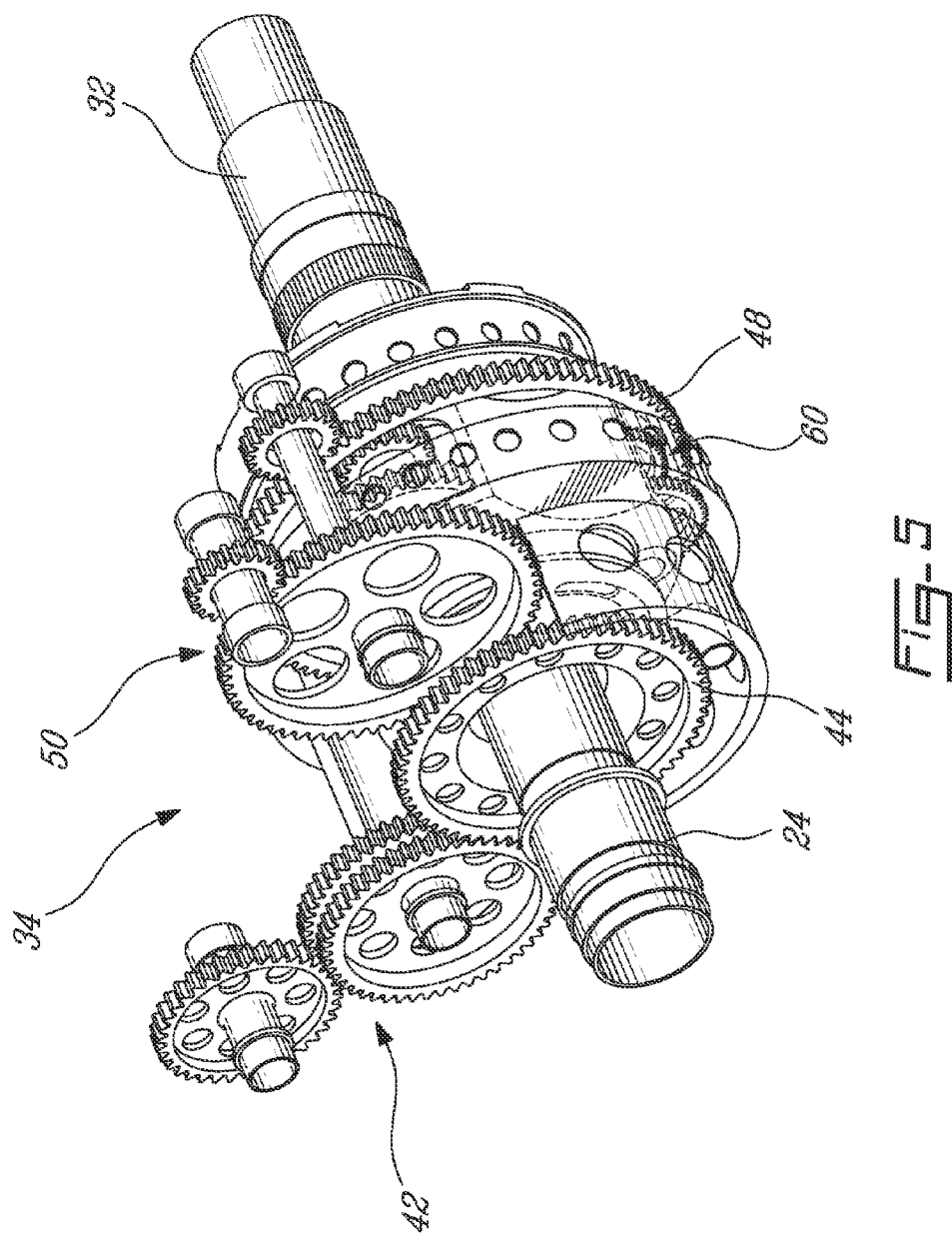
FIG. 5 is a tridimensional view of a differential of the transmissions of FIGS. 3-4.

Referring to FIGS. 3-5, in a particular embodiment, the variable transmission 30 generally includes a differential 34, two means for transferring power which in the particular embodiment shown are electric power transfer devices 36, 38 usable as electric motor/generators, and a control unit 40. The two power transfer devices 36, 38 are interconnected through an electrical circuit 68 to allow transfer of power therebetween. In the embodiment shown, the control unit 40 is part of the circuit 68.

The first power transfer device 36 is coupled to the low pressure shaft 24, either directly (FIG. 3) or through one or more intermediate members such as for example an offset gear arrangement 42 (FIGS. 4-5); the coupling is preferably selected to match the machine's optimal rotational speed with that of the low pressure shaft 24.

The differential 34 has coupled members which include a driven member 44 connected to the low pressure shaft 24, a driving member 46 connected to the transmission shaft 32, and a selectively rotatable member 48 which is coupled to the driven and driving members 44, 46 such that its rotational speed determines the ratio between the rotational speeds of the driven and driving members 44, 46. The second power transfer device 38 is coupled to the selectively rotatable member 48, either directly or through an offset gear arrangement 50 (as shown) such as to vary the ratio of the transmission 30 in a continuous manner.

In the embodiment shown, the differential 34 includes two coupled planetary gear systems 52, 54 (see FIG. 3). The sun gear of the first system is the driven member 44 and as such is drivingly engaged to the low pressure shaft 24, for example by being formed integrally therewith. The first system 52 includes a plurality of planet gears 56 (only one of which is shown) meshed with the sun gear 44 and retained by a carrier 58, and an annular ring gear 60 (only partially shown in FIG. 3) surrounding the planet gears 56 and meshed therewith. The ring gear 60 of the first system 52 is fixed.

The sun gear of the second system 54 is the driving member 46 and as such is drivingly engaged to the transmission shaft 32, for example by being formed integrally therewith. The second system 54 includes a plurality of planet gears 62 (only one of which is shown) meshed with the sun gear 46 and retained by a carrier 64, and an annular ring gear surrounding the planet gears and meshed therewith. The two carriers 58, 64 are interconnected such as to couple the two planetary systems 52, 54. The ring gear of the second system is the selectively rotatable member 48 and as such is drivingly engaged to the second power transfer device 38. The second power transfer device 38 maintains a torque on the second ring gear 48 to prevent its free rotation.

Alternate transmission configurations are also possible. For example, the configuration described above could be used with the first power transfer device 36 being indirectly coupled to the low pressure shaft 24 through engagement with the connected carriers 58, 64. The configuration described above could also be modified by inverting the roles of the two ring gears, i.e. having the second power transfer device 38 coupled to the ring gear of the first system 52 with the ring gear of the second system 54 being fixed. A differential with a single planetary system may alternately be used, for example with the first power transfer device 36 engaged to the low pressure shaft 24, the ring gear engaged to the second power transfer device 38, the carrier engaged to the transmission shaft 32 and the sun gear engaged to the low pressure shaft 24, provided the speed ratios and maximum rotational speeds are adapted for a single planetary system. Other alternate configurations are also possible, including a differential having a different configuration than a planetary system.

In use, the speed of the transmission shaft 32 may be adjusted independently of the rotational speed of the high pressure compressor and turbine rotors, e.g. while keeping the rotational speed of the high pressure compressor and turbine rotors 114, 118 at a constant or substantially constant value, by transferring power between the low pressure shaft 24 and the transmission 30 through the power transfer devices 36, 38, to change the rotational speed ratio between the transmission shaft 32 and the low pressure shaft 24.

In a particular embodiment, the power transfer devices 36, 38 form a bidirectional system, i.e. both power transfer devices 36, 38 may alternately be used as a motor and as a generator. Accordingly, the differential 34 is sized such that when the second ring gear 48 is maintained in a fixed position, the transmission shaft 32, and as such the low pressure compressor rotor 112, rotates at an intermediate speed, for example 50% of its maximum speed. To increase the speed of the transmission shaft 32, the second power transfer device 38 is used as a motor to rotate the second ring gear 48 in a direction opposite that of the carriers 58, 64, which causes the sun gear 46 of the second system 54 to rotate faster. A faster rotation of the second ring gear 48 in a direction opposite of that of the carriers 58, 64 causes the second sun gear 46 together with the transmission shaft 32 and the low pressure compressor rotor 112 to rotate faster. The first power transfer device 36 is used as a generator to produce electricity from the rotation of the low pressure shaft 24, which is converted to the appropriate frequency by the control unit 40 and transferred to the second power transfer device 38 through the circuit 68 to power its rotation.

To reduce the speed of the transmission shaft 32, the second ring gear 48 is allowed to rotate in the same direction as the carriers 58, 64, and the second power transfer device 38 is used as a generator to brake the rotation of the second ring gear 48. A slower rotation of the second ring gear 48 causes the second sun gear 46 together with the transmission shaft 32 and the low pressure compressor rotor 112 to rotate slower. The electricity produced by the second power transfer device 38 is converted to the appropriate frequency by the control unit 40 and transferred to the first power transfer device 36 through the circuit 68 to return power to the low pressure shaft 24 in the form of increased torque.

In another embodiment, the power transfer devices 36, 38 form a unidirectional system. For example, the second power transfer device 38 coupled to the second ring gear 48 is used only as a generator and the first power transfer device 36 coupled to the low pressure shaft 24 is used only as a motor. Accordingly, the differential 34 is sized such that when the second ring gear 48 is maintained in a fixed position, the transmission shaft 32 rotates at a maximum desired speed. The speed of the transmission shaft 32 is decreased from that point as detailed above, and the power generated is returned to the low pressure shaft 24 in the form of increased torque. Alternately, the second power transfer device 38 coupled to the second ring gear 48 may be used only as a motor with the first power transfer device 36 coupled to the low pressure shaft 24 used only as a generator. The differential 34 is sized such that when the second ring gear 48 is maintained in a fixed position, the transmission shaft 32 rotates at a minimum desired speed. The speed of the transmission shaft 32 is increased from that point as detailed above, using power generated from the low pressure shaft 24 by the first power transfer device 36 to drive the second power transfer device 38. The unidirectional systems however typically necessitate larger power transfer devices 36, 38 since the necessary torque range will generally be larger to obtain a same speed variation as an equivalent bidirectional system.

Figure 6:
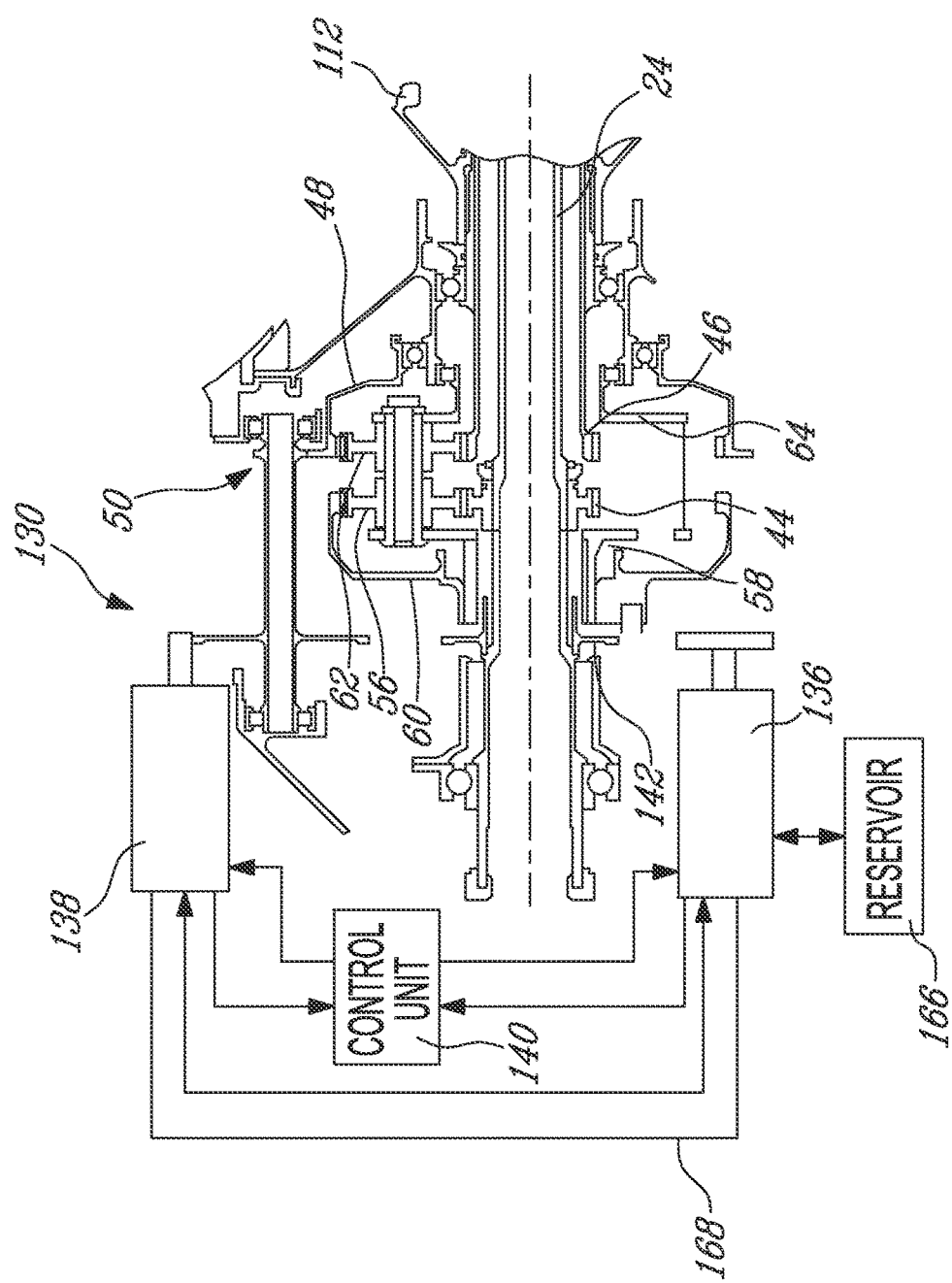
FIG. 6 is a schematic cross sectional view of an alternate transmission of the gas turbine engine of FIG. 2.

Referring to FIG. 6, a variable transmission 130 in accordance with another embodiment includes the differential 34 described above and means for transferring power in the form of two hydraulic power transfer devices 136, 138. The power transfer devices 136, 138 are interconnected by a closed hydraulic circuit 168 and connected to a control unit 140, and hydraulic power is transferred between the devices 136, 138 through a flow of hydraulic fluid in the circuit 168.

In one embodiment, the first power transfer device 136 is a pump including an auxiliary pump (not shown) to pump hydraulic fluid from a reservoir 166 as required. In the embodiment shown, the first power transfer device 136 has a smaller optimal rotational speed than the rotational speed of a low pressure shaft 24 and as such is coupled thereto through an offset gear arrangement 142. Alternately, for power transfer devices having optimal rotational speeds corresponding to that of the low pressure shaft, a direct connection may be provided.

The second ring gear 48 is drivingly engaged to the second power transfer device 138, for example through an offset gear arrangement 50. The second power transfer device 138 maintains a torque on the second ring gear 48 to prevent its free rotation.

In a particular embodiment, the power transfer devices 136, 138 may both be alternately operated as a pump and as a motor, providing for a bidirectional system. The power transfer device 136, 138 acting as a pump supplies a flow of hydraulic fluid to the power transfer device 136, 138 acting as a motor through a closed hydraulic circuit 168. In a particular embodiment, at least one of the power transfer devices 136, 138 has a variable displacement such as to be able to vary the rotational speed of the second power transfer device 138 through variation of the displacement. In one embodiment, both power transfer devices 136, 138 have a variable displacement for increased controlled speed range. The control unit 140 changes the displacement of the variable unit(s) as required. Alternately, the rotational speed of the second power transfer device 138 may be varied by changing the hydraulic pressure in the circuit 168, for example by having the control unit 140 actuating a pressure valve.

Accordingly, as above, the differential 34 is sized such that when the second ring gear 48 is maintained in a fixed position, the transmission shaft 32 rotates at an intermediate speed, for example 50% of its maximum speed. To increase the speed of the transmission shaft 32, the second power transfer device 138 is used as a motor to rotate the second ring gear 48 in a direction opposite that of the carriers 58, 64. The first power transfer device 136 is used as a pump, driven by the low pressure shaft 24 to circulate the hydraulic fluid within the circuit 168 to power the rotational motion of the second power transfer device 138. To reduce the speed of the transmission shaft 32, the second ring gear 48 is allowed to rotate in the same direction as the carriers 58, 64, and the second power transfer device 138 is used as a pump, braking the rotation of the second ring gear 48. The hydraulic flow produced by the second power transfer device 138 powers the first power transfer device 136 which is used as a motor to return power to the low pressure shaft 24 in the form of increased torque.

In another embodiment, the power transfer devices 136, 138 form a unidirectional system. For example, the second power transfer device 138 coupled to the second ring gear 48 is used only as a pump, with the fixed position of the second ring gear 48 corresponding to the maximum desired speed of the transmission output shaft 32. The speed of the transmission shaft 32 is decreased from that point as detailed above, and the power generated is returned to the low pressure shaft 24 in the form of increased torque by the first power transfer device 136 working only as a motor and powered by the hydraulic flow produced by the second power transfer device 138. Alternately, the second power transfer device 138 coupled to the second ring gear 48 may be used only as a motor, with the fixed position of the second ring gear 48 corresponding to the minimum desired speed of the transmission output shaft 32. The speed of the transmission shaft 32 is increased from that point as detailed above, by powering the second power transfer device 138 with the hydraulic flow generated by the first power transfer device 136 driven by the low pressure shaft 24.

The means for transferring power may alternately be other types of power transfer devices, for example pneumatic motors/compressors. Pneumatic power is transferred between the power transfer devices through a flow of compressed air in a pneumatic circuit between the devices. As above, bidirectional or unidirectional systems can be used.

Advantageously, the variable transmission 30, 130 driving the low pressure compressor rotor(s) 112 may help optimize the performances and surge margin of the low pressure compressor 12, by scheduling the speed of the low pressure compressor rotor(s) 112 as a function of the aerodynamic speed of the high pressure compressor rotor(s) 114.

This can be done for example by using the engine electronic control (EEC), which typically receives data on the rotational speed of the rotors 112, 114 of both compressors 12, 14. The EEC governs the low pressure turbine 120 to a set rotational speed and from the other data received from the various engine sensors (e.g. temperatures at the inlet of the low and high pressure compressors 12, 14, rotational speed of the low and high pressure compressor rotors 112, 114, fuel flow, rotational speed of low pressure turbine rotor(s) 120) determines a desired rotational speed for the low pressure compressor rotor(s) 112 and commands it from the control unit 40, 140, which accordingly actuates the power transfer between the power transfer devices 36, 38, 136, 138.

The use of the transmission 30, 130 may also allow for the power output of the engine 10 to be varied while maintaining core temperature and rotational speeds where the turbine sections 18, 20 are most efficient. The variable transmission 30, 130 may allow for the low pressure compressor 12 to operate at a more optimum speed relative to the power demand, thus increasing its efficiency even when keeping the turbine sections 18, 20 at constant or relatively constant speeds. Accordingly, it may also allow for the high pressure section to be maintained at a more constant speed throughout the range of power demands. In a particular embodiment, the variable transmission 30, 130 allows for the rotational speed of the high pressure turbine section 18 to be kept within a range of approximately from 80 to 100% of its optimal speed, by contrast with an equivalent engine having the low pressure compressor directly driven by the low pressure shaft which typically has the high pressure turbine section rotating within a range of 50 to 100% of its optimal speed.

Figure 7:
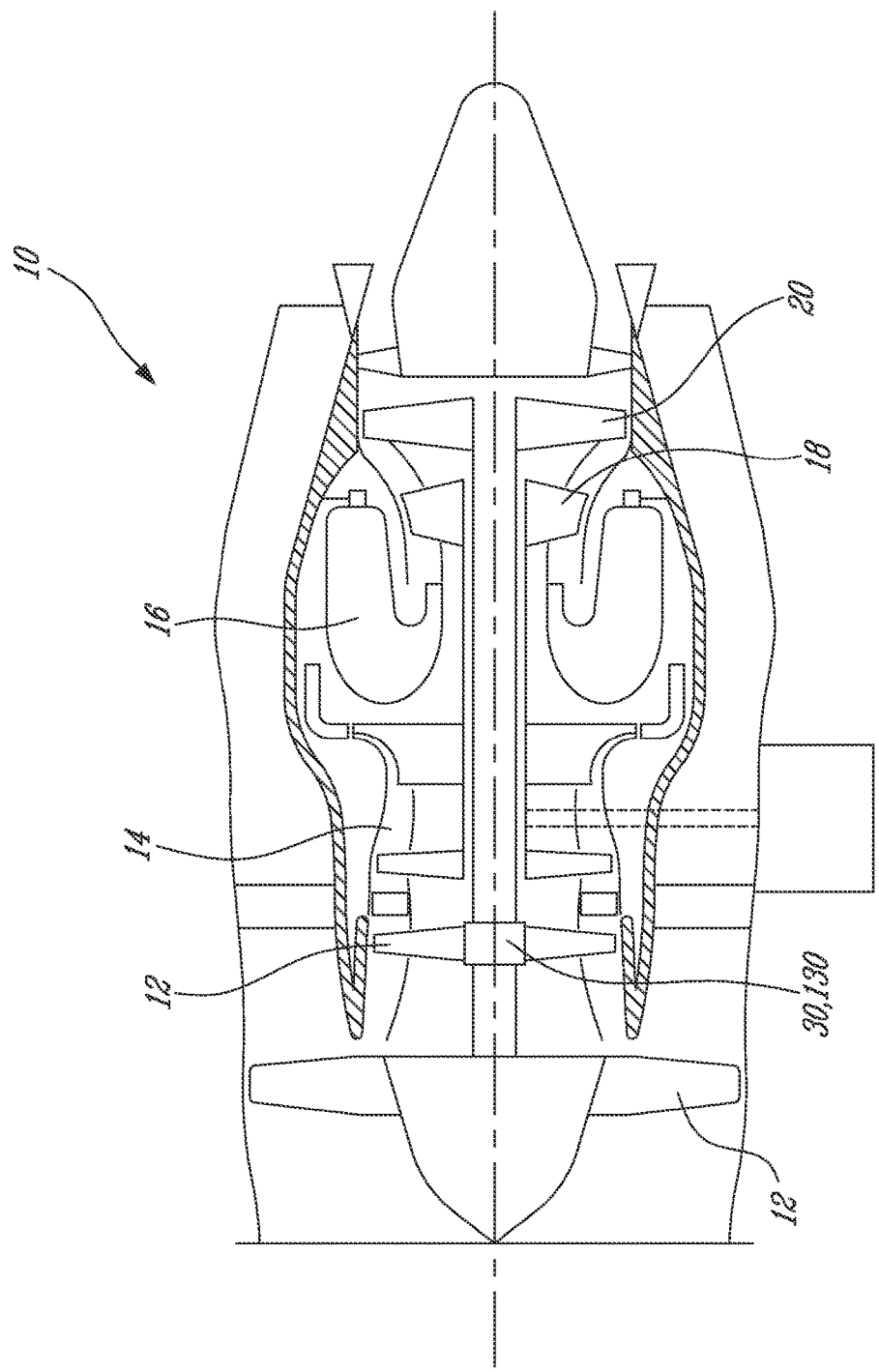
FIG. 7 is a schematic cross sectional view of another exemplary gas turbine engine such as that shown in FIG. 1.
Figure 8:
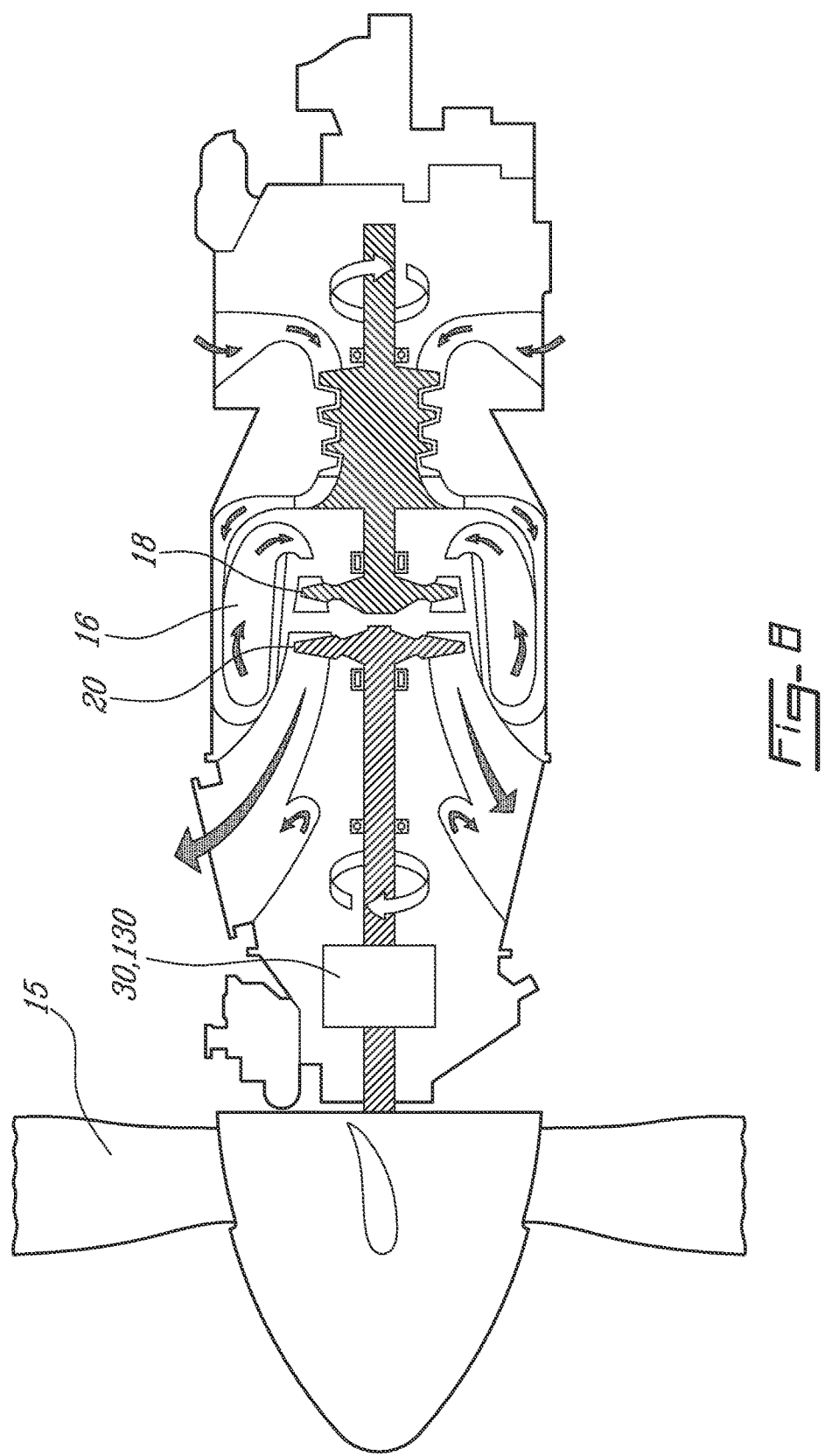
FIG. 8 is a schematic cross sectional view of a further exemplary gas turbine engine such as that shown in FIG. 1.

Although the transmission 30, 130 has been described here as being applied to driving the low pressure compressor rotor(s) 112 in a turboshaft engine, other applications are also possible. The transmission 30, 130 can be used to drive the rotor(s) of low pressure compressors 12 in other types of gas turbine engines, for example turbofans (FIG. 7) and turboprops. Also, the engine output shaft 26 of FIGS. 1-2 may be an integral part of or connected to the transmission shaft 32 such that the transmission 30, 130 affects the rotational speed of the engine output shaft 26. Such a configuration can be used in replacement of or in addition to having the low pressure compressor rotor(s) 112 driven through the transmission 30, 130. Similarly, for a turbofan, the transmission shaft 32 may be keyed to the fan such that the transmission 30, 130 affects the rotational speed of the fan, in addition or in replacement to having other rotor(s) of the low pressure compressor 12 driven through the transmission 30, 130. The transmission 30, 130 may also be used to drive a propeller 15 in a turboprop engine in replacement to having a low pressure compressor driven through the transmission, as shown in FIG. 8, or in addition thereto. The transmission 30, 130 may also be used in any type of gas turbine engine, including industrial power plants and auxiliary power units, for example to drive low pressure compressor rotor(s).

Accordingly, the above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising:
at least two independently rotatable engine spools;
at least one turbine rotor drivingly engaged to a first one of the engine spools;
a transmission having a differential having coupled members including a driven member, a driving member, and a selectively rotatable member, the driven member being drivingly engaged to the first spool;
a rotatable shaft drivingly engaged to the driving member and rotatable independently from all but the first of the engine spools;
a compressor rotor drivingly engaged to the rotatable shaft;
an output shaft drivingly engaged to the first spool independently of the transmission;
a first power transfer device drivingly engaged to the first spool;
a second power transfer device drivingly engaged to the selectively rotatable member;
a circuit interconnecting the power transfer devices and allowing a power transfer therebetween; and
a control unit controlling the power being transferred between the power transfer devices through the circuit;
wherein a rotational speed of the selectively rotatable member coupled to the driven and driving members determines a variable ratio between rotational speeds of the at least one turbine rotor and of the compressor rotor; and
wherein the second power transfer device is configured to vary the rotational speed of the selectively rotatable member of the transmission to vary the ratio between the rotational speeds of the at least one turbine rotor and of the compressor rotor, the output shaft being unaffected by the transmission.

2. The gas turbine engine as defined in claim 1, wherein the first power transfer device is operable to both transfer power to and generate power from the first spool, and the second power transfer device is operable to both transfer power to and generate power from the selectively rotatable member.

3. The gas turbine engine as defined in claim 1, wherein the power transfer devices are electric machines and the circuit is an electric circuit, the control unit controlling electric power being transferred between the power transfer devices.

4. The gas turbine engine as defined in claim 1, wherein the power transfer devices are hydraulic machines and the circuit is a hydraulic circuit, the control unit controlling a flow of hydraulic fluid being transferred between the power transfer devices.

5. The gas turbine engine as defined in claim 4, wherein at least one of the first and second power transfer devices has a variable displacement.

6. The gas turbine engine as defined in claim 1, wherein the power transfer devices are pneumatic machines and the circuit is a pneumatic circuit, the control unit controlling a flow of compressed air being transferred between the power transfer devices.

7. The gas turbine engine as defined in claim 1, wherein the differential includes first and second coupled planetary gear systems, each system having:
a sun gear;
a plurality of planet gears meshed with the sun gear and supported by a carrier around the sun gear; and
an annular ring gear around the planet gears and meshed therewith.

8. The gas turbine engine as defined in claim 7, wherein the carriers of the first and second systems are interconnected, the driven member is the sun gear of the first system, the driving member is the sun gear of the second system, the ring gear of one of the first and second systems is fixed, and the selectively rotatable member is the ring gear of the other of the first and second systems.

9. A gas turbine engine comprising:
a low pressure turbine located downstream of and in fluid communication with an exhaust of a high pressure section of the engine, the low pressure turbine having at least one turbine rotor;
a transmission having a differential having coupled members including a driven member, a driving member, and a selectively rotatable member;
a low pressure shaft drivingly interconnecting each turbine rotor to the driven member;
an output shaft drivingly engaged to the low pressure shaft independently of the transmission;
a low pressure compressor located upstream of and having an exhaust in fluid communication with the high pressure section of the engine, the low pressure compressor having at least one compressor rotor drivingly interconnected to the driving member;
a first power transfer device engaged to the low pressure shaft for at least one of transferring power thereto and generating power therefrom;
a second power transfer device engaged to the selectively rotatable member for at least the other of transferring power thereto and generating power therefrom; and
a control unit connecting the first and second power transfer devices and controlling power being transferred therebetween;
wherein a rotational speed of the selectively rotatable member of the transmission coupled to the driven and driving members determines a variable ratio between rotational speeds of each turbine rotor and of the at least one compressor rotor; and
wherein the second power transfer device is configured to vary the rotational speed of the selectively rotatable member to vary the ratio between the rotational speeds of each turbine rotor and of the at least one compressor rotor, the output shaft being unaffected by the transmission.

10. The gas turbine engine as defined in claim 9, wherein the first power transfer device is operable to selectively transfer power to and generate power from the low pressure shaft, and the second power transfer device is operable to selectively transfer power to and generate power from the selectively rotatable member.

11. The gas turbine engine as defined in claim 9, wherein the first and second power transfer devices include first and second electric machines with at least one of the electric machines being operable as a generator and at least the other of the electric machines being operable as a motor, and the control unit controls electric power being transferred between the electric machines.

12. The gas turbine engine as defined in claim 9, wherein the first and second power transfer devices include first and second hydraulic machines with at least one of the hydraulic machines being operable as a pump and at least the other of the hydraulic machines being operable as a motor, and the control unit controls hydraulic power being transferred between the hydraulic machines.

13. The gas turbine engine as defined in claim 9, wherein the first and second power transfer devices include first and second pneumatic machines with at least one of the pneumatic machines being operable as a compressor and at least the other of the pneumatic machines being operable as a motor, and the control unit controls pneumatic power being transferred between the pneumatic machines.

14. The gas turbine engine as defined in claim 9, wherein the differential includes first and second coupled planetary gear systems, each system having a sun gear, a plurality of planet gears supported by a carrier around the sun gear and meshed therewith, and an annular ring gear around the planet gears and meshed therewith.

15. The gas turbine engine as defined in claim 14, wherein the carriers of the first and second systems are interconnected, the driven member is the sun gear of the first system, the driving member is the sun gear of the second system, the ring gear of one of the first and second systems is fixed, and the selectively rotatable member is the ring gear of the other of the first and second systems.

* * * * *